United States Patent [19]
Naidu

[11] 3,964,780
[45] June 22, 1976

[54] SNOW PROTECTORS FOR WINDSHIELDS

[76] Inventor: Panjeti Babu Naidu, 89-15 Parsons Blvd., New York, N.Y. 11432

[22] Filed: May 17, 1974

[21] Appl. No.: 470,816

[52] U.S. Cl.............................. 296/95 C; 160/368 S
[51] Int. Cl.²........................................... B60J 1/20
[58] Field of Search ...... 296/95 C; 160/368 S, 23 R; 224/49, 55; 52/171, 172, 202, 203

[56] References Cited
UNITED STATES PATENTS

| | | | |
|---|---|---|---|
| 1,314,397 | 8/1919 | Heffron | 224/49 X |
| 1,479,903 | 1/1924 | Erland | 224/49 X |
| 2,102,597 | 12/1937 | Mable | 52/203 |
| 2,223,145 | 11/1940 | Wise | 296/95 C |
| 2,646,118 | 7/1953 | Berty | 296/95 C |
| 3,021,894 | 2/1962 | Due | 160/23 R |
| 3,042,111 | 7/1932 | Wytovich | 160/368 S X |
| 3,698,761 | 10/1971 | Niwa | 52/171 X |
| 3,736,404 | 5/1973 | Eisler | 52/171 X |
| 3,751,100 | 8/1973 | Keyes | 296/95 C |
| 3,792,806 | 9/1972 | Layton | 224/49 |

FOREIGN PATENTS OR APPLICATIONS

| | | | |
|---|---|---|---|
| 611,191 | 12/1960 | Canada | 296/95 C |

*Primary Examiner*—Robert J. Spar
*Assistant Examiner*—Donald W. Underwood
*Attorney, Agent, or Firm*—Kenneth S. Goldfarb

[57] ABSTRACT

A disposable wind-shield snow protector adapted to be removably secured to the wind-shield of an automobile, bus, truck and the like including a flexible protection sheet and a backing sheet in overlying relationship to each other. The protection sheet includes a cord reinforcing secured to the rearward side thereof and is affixed to a handle located beyond the periphery of the protection sheet. The backing sheet is adapted to be peeled away from the protection sheet to expose an adhesive coating that adapts the device to be removably secured to any desired wind-shield. Removal by hand is easily facilitated by use of the handle provided and the device is then discarded.

2 Claims, 8 Drawing Figures

SNOW PROTECTORS FOR WINDSHIELDS

BACKGROUND OF THE INVENTION

1. Field of the Invention

This invention relates to a wind-shield snow protector device and more particularly to a disposable device for convenient removable attachment to the surface of the wind-shield of any vehicle which does not require special fasteners, magnets, or the like for its attachment.

2. Description of the Prior Art

Various types of wind-shield protectors have been used in the past which usually require metallic means or magnets for attachment to the vehicle. Alternatively, a clip arrangement must be provided on the vehicle to engage and hold the desired protection device in place. Devices such as these are expensive to produce and accordingly are designed to be reusable. Further, the use of metallic parts and securing means often cause damage to the vehicle by scratching the matal parts to which they are attached.

In the past various attempts have been made to protect the wind-shield of an automobile from snow but these devices are often costly and require metallic components that are potentially dangerous to the exterior surfaces of a vehicle. Because of the expense involved these devices are adapted to be reusable many times.

BRIEF SUMMARY OF THE INVENTION

This invention overcomes the disadvantages of the prior art by providing a disposable wind-shield snow protection device which can be easily self-secured to the wind-shield of a vehicle, and when it has served its purpose, can be easily removed without in any way affecting the surface to which it was attached.

The structure of this invention features the use of a flexible protection sheet coated with adhesives on the rearward side and formed of any suitable plastic such as vinyl or the like, and which may be manufactured in any suitable size and configuration. A cord reinforcing is secured to the rearward side of the protection sheet by a heat process or by adhesives or the like. The cord reinforcing is formed of any suitable flexible material such as nylon or the like, and may be secured to the rearward side of the protection sheet in any desired configuration or arrangement. A handle is affixed to the cord reinforcing beyond the periphery of the protection sheet and may be formed of any suitable material such as wood, plastic, or the like. The cord reinforcing may be affixed to the handle by any known fastening means such as screws or the like. A backing sheet is provided in overlying relationship to the protection sheet and adapted to be peeled away from the protection sheet to expose the adhesive coating. The backing sheet is formed of any suitable material such as paper or the like and is manufactured of any suitable size and configuration to cover the adhesive coating on the rearward side of the protection sheet.

Still further objects and features of this invention reside in the provision of a wind-shield snow protection device that is simple in construction, inexpensive to manufacture, thereby permitting wide use and distribution. The invention will aid the user in being easily applied and removed and generally being easy to handle and dispose of.

These, together with the various ancillary objects and features of the invention which will become apparent as the following description proceeds, are attained by this wind-shield snow protector, preferred embodiments of which are shown in the accompanying drawing, by way of example only, wherein:

DETAILED DESCRIPTION OF THE INVENTION

Figure 1:
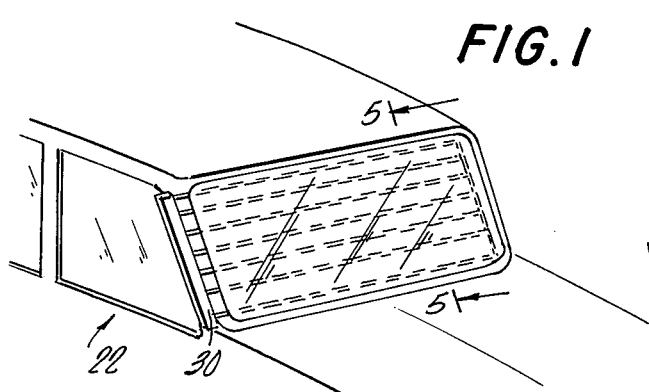
FIG. 1 is a perspective view of a preferred embodiment of the wind-shield snow protector, shown attached to a vehicle.
Figure 2:
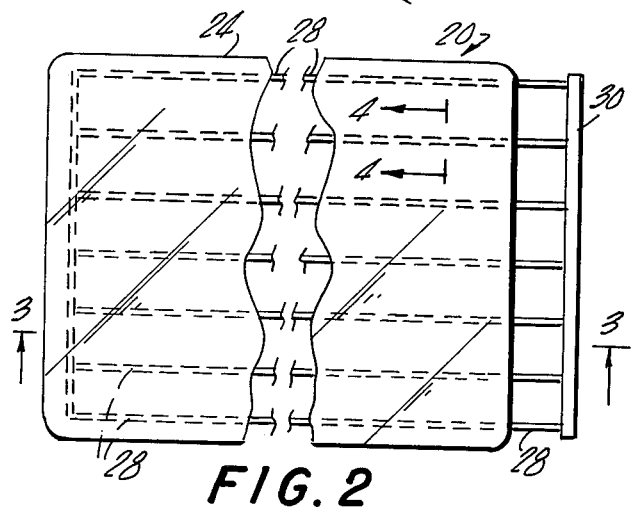
FIG. 2 is a partial elevational view of the invention with parts thereof being broken away to show other parts in detail.

With continuing reference to the accompanying drawings wherein like reference numerals designate similar parts throughout the various views and with specific attention directed to the embodiment of FIGS. 1 through 5, reference numeral 20 is used generally to designate a wind-shield snow protection device constructed in accordance with the concepts of this invention, and which is self-securable to any type of vehicle 22, such as the automobile shown. The snow protection device is equally adaptable for use on busses, trucks, trains, and on other vehicles and on any glass surface. The snow protector 20 is especially adapted for protecting a wind-shield 34 from snow and the like and then easily removed by hand and discarded.

The snow protection device 20 includes a flexible protection sheet 24, in the form of a sheet of any suitable plastic material such as vinyl or the like, which is flexible and inexpensive to manufacture in any desired configuration. The backing sheet 26 is of any suitable material such as paper or the like and is in overlying relationship to protection sheet 24. A flexible cord reinforcing 28 is secured to the rearward side of protection sheet 24 by a heat process or by adhesives or the like and is placed in any desired configuration between protection sheet 24 and backing sheet 26. The reinforcing 28 is located substantially within the periphery of protection sheet 24 except on one side wherein reinforcing 28 extends outwardly and beyond the periphery of sheet 24 and is affixed to handle 30. Handle 30 is of wood or plastic or the like and is affixed to reinforcing 28 by known fastening means beyond the periphery of sheet 24 and sheet 26.

Figure 3:
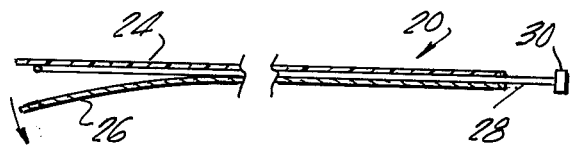
FIG. 3 is a partial horizontal sectional view, taken along the plane of line 3—3 in FIG. 2.
Figure 4:
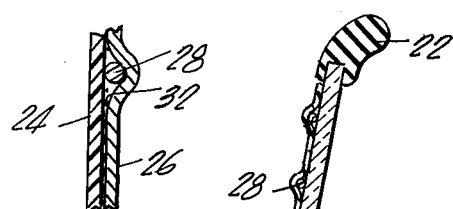
FIG. 4 is an enlarged vertical sectional detail, taken along the plane of line 4—4 of FIG. 2.
Figure 5:
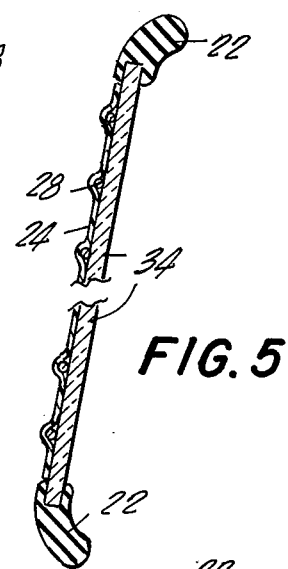
FIG. 5 is a partial vertical sectional view, taken along the plane of line 5—5 of FIG. 1.

Applied to the rearward side of protection sheet 24 is an adhesive coating 32 adapting the protection sheet to be removably self-secured to the wind-shield 34 of any vehicle. Backing sheet 26 is coextensive with the protection sheet 24 and completely covers the adhesive coating 32 when in place on the rearward side of sheet 24. As can be readily understood, the backing sheet 26 can be peeled away completely and discarded as shown in FIG. 3, thereby exposing the adhesive coating 32. The protection sheet 24 may then be pressed by hand onto the glass wind-shield 34 and thereby become removably self-secured to the wind-shield 34 due to adhesive coating 32.

Adhesives are well known in the art and include various types of polymeric materials e.g., epoxy polymers and the like as as well as casein-based substances. The particular adhesive selected is not critical.

The protection sheet 24 may be removed by hand by use of handle 30. By pulling the handle 30 away from the windshield 34 the cord reinforcing 28 affixed thereto is pulled away from the wind-shield 34. The protection sheet 24 being secured to reinforcing 28 is therefore lifted away from the wind-shield 34 easily by the use of handle 30. The protection sheet 24, reinforcing 28, and handle 30 are discarded once removed and the wind-shield 34 is now clear of any matter such as snow or the like that might have fallen onto the vehicle 22.

Figure 6:
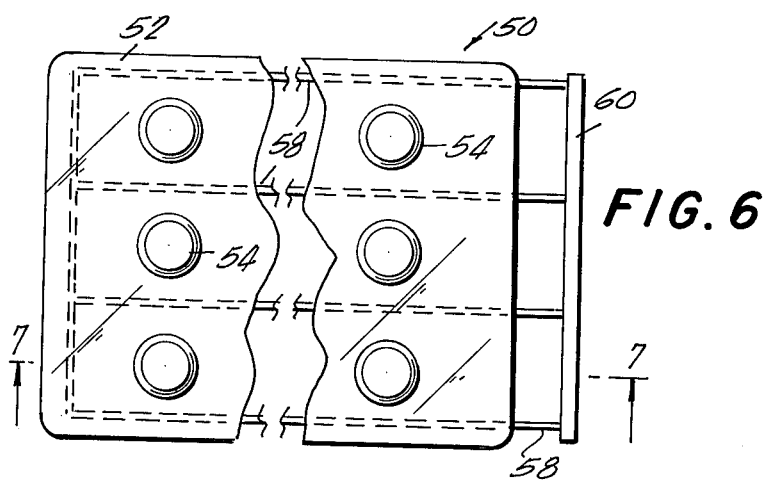
FIG. 6 is a partial elevational view of another embodiment of the invention with parts thereof being broken away to show other parts in detail.
Figure 7:
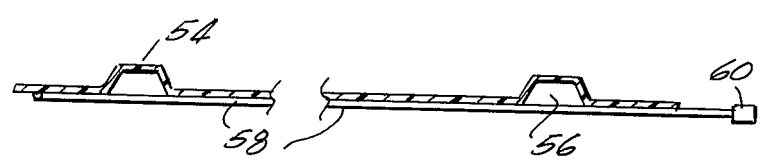
FIG. 7 is a partial horizontal sectional view, taken along the plane of line 7—7 in FIG. 6.
Figure 8:
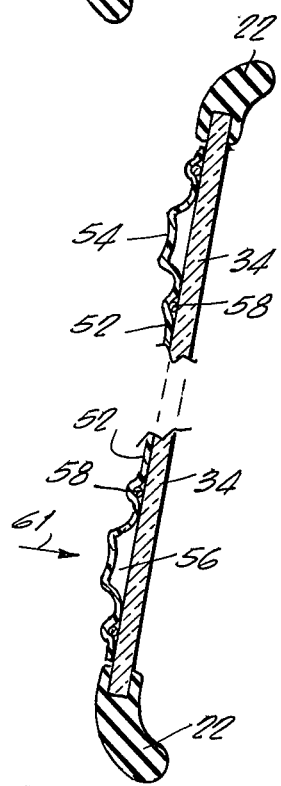
FIG. 8 is a partial vertical sectional view of the embodiment shown in FIG. 6, similar to the view taken in FIG. 5.

Now directing attention to the embodiment of FIGS. 6 through 8, reference numeral 50 is used to generally designate another embodiment of a wind-shield snow protector constructed in accordance with the concepts of this invention, and which is self-securable to any wind-shield 34. The snow protector 50 includes a flexible protection sheet 52, in the form of a sheet of any suitable plastic material such as vinyl or the like, which is flexible and inexpensive to manufacture. A plurality of suction cups 54 are formed into the protection sheet 52 having their open side 56 facing the rearward side of protection sheet 52. A flexible cord reinforcing 58 is secured to the rearward side of protection sheet 52 by a heat process or by adhesives or the like and is placed in any desired configuration except rearwardly of the openings 56 of suction cups 54. The reinforcing 58 extends beyond the periphery of protection sheet 52 on one side and is affixed to handle 60 of wood or plastic or the like by known fastening means.

The protection sheet 52 may be removably self-secured to wind-shield 34 by applying pressure to the suction cups 54 in the direction of arrow 61 while the rearward surface of sheet 52 is in engagement with wind-shield 34. As can be easily understood, the protection sheet 52 can be removed by hand by pulling handle 60 away from wind-shield 34. The snow protector 50 can be stored after use and is re-usable as suction cups 54 adapt the protection sheet 52 to be removably self-securable to wind-shield 34 many times.

A latitude of modification, substitution and change is intended in the foregoing disclosure, and in some instances, some features of the present invention may be employed without a corresponding use of other features.

I claim:
1. A wind-shield snow protector comprising a flexible plastic protection sheet, a plurality of flexible cord reinforcing elements bonded to and substantially along the entire length of the rearward side of said protection sheet, said plurality of cord reinforcing elements extending outwardly beyond the periphery of said protection sheet in at least one direction, at least one handle located beyond the periphery of said protection sheet, the free ends of said plurality of extending cord elements being secured to said handle, an adhesive coating on the rearward side of said protection sheet and at least along the outer edges thereof for detachably securing said protection sheet to a windshield, said adhesive preventing frost from creeping underneath the protective sheet said cord reinforcing elements being located inwardly of the periphery of said protection sheet except where said reinforcing elements extend outwardly beyond the periphery of said sheet and are affixed to said handle, and a easily removable paper backing sheet engaging said coating of adhesive and being in overlying relation to said protection sheet.

2. A snow protector according to claim 1, wherein said cord reinforcing is of nylon.

* * * * *